UNITED STATES PATENT OFFICE.

J. W. WYKES, OF WHEELING, VIRGINIA.

BACKGROUND FOR PHOTOGRAPHS ON GLASS.

Specification forming part of Letters Patent No. 17,651, dated June 23, 1857.

*To all whom it may concern:*

Be it known that I, J. W. WYKES, of Wheeling, in the county of Ohio and State of Virginia, have invented a new and useful Improvement in Collodion and Albumen Pictures on Glass; and I do hereby declare that the following is a full, clear, and exact description of the same.

The object of my invention is, with a single picture, to produce the rounded and life-like image of stereoscopic pictures.

The picture is first made on glass by the use of collodion or albumen in the usual manner. The image is then blacked to its edge, or very near thereto. The blacked face of the glass is then enameled, as follows: five parts of powdered rosin and one part of dry color are mixed together, and the face of the glass aforesaid lightly covered with the mixture. Heat is then applied to the other face of the glass with a spirit-flame for a few seconds, and the enameling is completed. The picture is then sealed up in the usual manner, and when incased is placed before a reflecting-background. This background may be either a mirror or any other reflecting-surface. This enameling of the glass removes the sharpness of outline common to pictures of this character, and the reflecting-background combined therewith imparts the desired life-like appearance.

The color of the enamel will be governed by the color made use of. The proportions of rosin and color above stated need not be rigidly adhered to, as they may be varied considerably without affecting the result.

I do not claim the blacking of the glass behind the image, neither do I claim the reflecting-background, such being well known; but What I do claim as new and of my own invention, and desire to secure by Letters Patent, is—

The application of the before-described enamel to collodion and albumen pictures on glass, substantially in the manner and for the purposes specified.

In testimony whereof I have hereunto signed my name before two subscribing witnesses.

J. W. WYKES.

Witnesses:
  GEO. PATTEN,
  JOHN S. HOLLINGSHEAD.